United States Patent
Okamatsu et al.

(10) Patent No.: US 10,781,347 B2
(45) Date of Patent: Sep. 22, 2020

(54) TIRE SEALANT AND TIRE REPAIR KIT

(71) Applicant: THE YOKOHAMA RUBBER CO., LTD., Minato-Ku, Tokyo (JP)

(72) Inventors: Takahiro Okamatsu, Hiratsuka (JP); Kiyohito Takahashi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 16/345,388

(22) PCT Filed: Nov. 10, 2017

(86) PCT No.: PCT/JP2017/040623
§ 371 (c)(1),
(2) Date: Apr. 26, 2019

(87) PCT Pub. No.: WO2018/088535
PCT Pub. Date: May 17, 2018

(65) Prior Publication Data
US 2019/0270920 A1    Sep. 5, 2019

(30) Foreign Application Priority Data
Nov. 10, 2016    (JP) ................................. 2016-219860

(51) Int. Cl.
*C09K 3/10* (2006.01)
*B29C 73/02* (2006.01)
*C08L 7/02* (2006.01)

(52) U.S. Cl.
CPC ................ *C09K 3/10* (2013.01); *B29C 73/02* (2013.01); *B29C 73/025* (2013.01); *C08L 7/02* (2013.01); *C08L 2201/52* (2013.01); *C09K 2200/062* (2013.01); *C09K 2200/0607* (2013.01); *C09K 2200/0622* (2013.01)

(58) Field of Classification Search
CPC .............. C09K 3/10; C09K 2200/0607; C09K 2200/062; C09K 2200/0622; B29C 73/02; B29C 73/025; C08L 7/02
USPC ........................................................ 523/166
See application file for complete search history.

(56) References Cited

FOREIGN PATENT DOCUMENTS

JP    2011-162681 A    8/2011

*Primary Examiner* — Edward J Cain
(74) *Attorney, Agent, or Firm* — Carrier Blackman & Associates, P.C.; Joseph P. Carrier; William D. Blackman

(57) ABSTRACT

An object of the present invention is to provide a tire sealant having excellent injectability and a tire repair kit. The present invention relates to a tire sealant containing a natural rubber latex; a synthetic resin emulsion; an anti-freezing agent; and phosphate ions or acetate ions; wherein the content of the phosphate ions is from $4.5 \times 10^{-3}$ to $11.0 \times 10^{-3}$ mass %; the content of the acetate ions is from 0.05 to 0.2 mass %; and the relative dielectric constant of the tire sealant is not less than 52.9; and a tire repair kit using the tire sealant.

20 Claims, No Drawings

TIRE SEALANT AND TIRE REPAIR KIT

TECHNICAL FIELD

The present invention relates to a tire sealant and a tire repair kit.

BACKGROUND ART

In recent years, there has been an increase in instances where a puncture repair kit is introduced as standard equipment or optional equipment in an automobile. A known puncture repair kit has a configuration in which a tire sealant, a compressor, and the like are combined and compactly packaged.

When a tire is punctured, the tire can be returned to a state in which travel is possible by using the above puncture repair kit and injecting the tire sealant into the tire interior via a tire valve using the compressor and the like.

Proposed examples of the above tire sealant include products containing a natural rubber latex, a synthetic resin emulsion, and an anti-freezing agent (for example, Patent Document 1).

Patent Document 1 describes a tire sealant comprising a natural rubber latex, an ethylene-vinyl acetate resin emulsion, a polyolefin emulsion, and an anti-freezing agent, wherein the mass ratio of solid component of the natural rubber latex and the ethylene-vinyl acetate resin emulsion (natural rubber/ethylene-vinyl acetate resin) is from 15/85 to 80/20, and the solid component of the polyolefin emulsion is from 0.5 to 10 parts by mass per 100 parts by mass of the total solid component of the natural rubber latex and the ethylene-vinyl acetate resin emulsion.

CITATION LIST

Patent Literature

Patent Document 1: JP 2011-162681 A

SUMMARY OF INVENTION

Technical Problem

The present inventors prepared and evaluated a tire sealant containing a natural rubber latex, a synthetic resin emulsion and an anti-freezing agent by referring to Patent Document 1 and revealed the possibility that the injectability of such a tire sealant can be further improved.

Thus, an object of the present invention is to provide a tire sealant having excellent injectability.

Another object of the present invention is to provide a tire repair kit.

Solution to Problem

As a result of diligent research to solve the above problem, the present inventors discovered that a desired effect is obtained by containing a natural rubber latex, a synthetic resin emulsion, an anti-freezing agent, and phosphate ions or acetate ions; and by allowing the content of phosphate ions or acetate ions and the relative dielectric constant to be within predetermined ranges, and the present inventors arrived at the present invention.

The present invention is based on the findings described above and, specifically, solves the problem described above by the following features.

1. A tire sealant including:
a natural rubber latex;
a synthetic resin emulsion;
an anti-freezing agent; and
phosphate ions or acetate ions; wherein
a content of the phosphate ions is from $4.5 \times 10^{-3}$ to $11.0 \times 10^{-3}$ mass %;
a content of the acetate ions is from 0.05 to 0.2 mass %; and
a relative dielectric constant is not less than 52.9.

2. The tire sealant according to 1 above, wherein the synthetic resin emulsion is at least one type selected from the group consisting of ethylene-vinyl acetate based copolymer emulsions, vinyl acetate homopolymer emulsions, and polysilicone emulsions.

3. The tire sealant according to 1 or 2 above, wherein the anti-freezing agent is at least one type selected from the group consisting of ethylene glycol, propylene glycol, diethylene glycol, and glycerin.

4. The tire sealant according to any one of 1 to 3 above, wherein a content 1 of a solid component of the natural rubber latex is from 15 to 90 mass % of a total mass of the content 1 and a content 2 of a solid component of the synthetic resin emulsion.

5. The tire sealant according to any one of 1 to 4 above, wherein a content of the anti-freezing agent is from 30 to 70 mass % of a total mass of water and the anti-freezing agent contained in the tire sealant described in any one of the above 1 to 4.

6. The tire sealant according to any one of 1 to 5 above, wherein the phosphate ions are at least one type selected from the group consisting of $H_2PO_4^-$, $HPO_4^{2-}$, and $PO_4^{3-}$.

7. The tire sealant according to any one of 1 to 6 above, further including a surfactant.

8. A tire repair kit including the tire sealant described in any one of 1 to 7 above and a compressor.

Advantageous Effects of Invention

A tire sealant according to an embodiment of the present invention has excellent injectability.

A tire repair kit according to an embodiment of the present invention has excellent injectability of the tire sealant.

DESCRIPTION OF EMBODIMENTS

Embodiments of the present invention are described in detail below.

Note that, in the present specification, (meth)acrylate represents acrylate or methacrylate, (meth)acryloyl represents acryloyl or methacryloyl, and (meth)acryl represents acryl or methacryl.

Additionally, in the present specification, numerical ranges indicated using "(from) . . . to . . . " include the former number as a lower limit value and the later number as an upper limit value.

In the present specification, unless otherwise noted, a single corresponding substance may be used for each component, or a combination of two or more types of corresponding substances may be used for each component. When a component contains two or more types of substances, the content of the component means the total content of the two or more types of substances.

In an embodiment of the present invention, the natural rubber latex contains natural rubber as dispersoid and a dispersion medium, and the natural rubber is dispersed in the dispersion medium. The synthetic resin emulsion contains a synthetic resin as dispersoid and a dispersion medium, and the synthetic resin is dispersed in the dispersion medium. Note that in an embodiment of the present invention, an emulsion includes a suspension (a system in which a solid-phase dispersoid is dispersed in a liquid dispersion medium) and a system in which a liquid-phase dispersoid is dispersed in a liquid-phase dispersion medium.

The dispersion medium contained in the natural latex or the synthetic resin emulsion is not particularly limited. Examples include water; and mixtures of water and a water-soluble organic solvent.

In an embodiment of the present invention, the solid component of a natural rubber latex signifies natural rubber. The content of the solid component of a natural rubber latex signifies the content of the natural rubber contained in the natural rubber latex or the total content of components of the natural rubber latex other than the dispersion medium. In an embodiment of the present invention, the content of natural rubber contained in the natural rubber latex and the total content of components of the natural rubber latex other than the dispersion medium are substantially the same.

In an embodiment of the present invention, the solid component of the synthetic resin emulsion signifies the synthetic resin. The content of the solid component of a synthetic resin emulsion signifies the content of synthetic resin contained in the synthetic resin emulsion or the total content of components of the synthetic resin emulsion other than the dispersion medium. In an embodiment of the present invention, the content of synthetic resin contained in the synthetic resin emulsion and the total content of components of the synthetic resin emulsion other than the dispersion medium are substantially the same.

Tire Sealant

The tire sealant of an embodiment of the present invention includes:
   a natural rubber latex;
   a synthetic resin emulsion;
   an anti-freezing agent; and
   phosphate ions or acetate ions; wherein
   a content of the phosphate ions is from $4.5 \times 10^{-3}$ to $11.0 \times 10^{-3}$ mass %;
   a content of the acetate ions is from 0.05 to 0.2 mass %; and
   a relative dielectric constant is not less than 52.9.

Note that the content of the phosphate ions described above is the mass % relative to the total mass of the tire sealant. The same applies to the content of the acetate ions.

Additionally, the relative dielectric constant described above is the relative dielectric constant of the tire sealant of an embodiment of the present invention.

The tire sealant according to an embodiment of the present invention is thought to achieve desired effects due to such a configuration. Although the reason is not clear, it is assumed to be as follows.

As described above, a typical tire sealant is injected into a tire from a tire valve using a compressor or the like. Metal parts such as a valve core are integrated in the valve described above. The tire sealant is injected under pressure using a compressor or the like into the tire via a narrow valve while in contact with the metal or the like. The present inventors found that when the contact angle of the tire sealant with the metal or the like is large, the injectability of the tire sealant into the tire is adversely affected.

The present inventors discovered that, in an embodiment of the present invention, the contact angle of the tire sealant with the metal or the like becomes smaller due to the content of phosphate ions and the relative dielectric constant being in predetermined ranges. Thus, it is presumed that even though the tire sealant undergoes conditions of pressurization and contacting with the metal or the like, a good dispersion of the natural rubber latex and the synthetic resin emulsion contained in the tire sealant can be maintained, and therefore the tire sealant can be efficiently injected into the tire (having excellent injectability).

Hereinafter, a detailed description of each constituent of the tire sealant according to an embodiment of the present invention will be given.

Natural Rubber Latex

The natural rubber latex included in the tire sealant according to an embodiment of the present invention is not particularly limited. Examples of the natural rubber latex that can be used include "deproteinized natural rubber latex", obtained by removing proteins from natural rubber latex.

The method of manufacturing the natural rubber latex is not particularly limited.

A commercially available product can be used as the natural rubber latex. Specific examples of commercially available products of the natural rubber latex include deproteinized natural rubber latex (SeLatex series, available from SRI Hybrid Ltd.), deproteinized natural rubber latex (Hytex HA, available from Fulflex, Inc., Nomura Trading Co., Ltd.), and ultra-low ammonia natural rubber latex (ULACOL, available from Regitex Co., Ltd.).

Synthetic Resin Emulsion

The synthetic resin emulsion contained in the tire sealant of an embodiment of the present invention is not particularly limited.

Examples of the synthetic resin emulsion include vinyl acetate based polymer emulsions and polysilicone emulsions.

The vinyl acetate based polymer emulsion is not particularly limited provided that the vinyl acetate based polymer contained in the above emulsion contains vinyl acetate repeating units.

The polysilicone emulsion is not particularly limited provided that the polysilicone contained in the above emulsion has a siloxane backbone ($-(Si-O)_n-$, where n is not less than 2).

Vinyl Acetate Based Polymer Emulsion

The vinyl acetate based polymer contained in the vinyl acetate based polymer emulsion can be either a homopolymer or a copolymer of vinyl acetate.

In a case where the vinyl acetate based polymer is a copolymer, monomers other than vinyl acetate are not particularly limited provided that they are compounds containing an ethylenically unsaturated bond. Examples include olefins such as ethylene; VeoVa (vinyl ester of versatic acid); (meth)acrylic esters, (meth)acrylic monomers such as (meth)acrylic acid; and aromatic vinyl compounds such as styrene.

Examples of the vinyl acetate based polymer emulsion include vinyl acetate homopolymer emulsions and vinyl acetate based copolymer emulsions.

Examples of the vinyl acetate based copolymer emulsion include ethylene-vinyl acetate based copolymer emulsions.

The ethylene-vinyl acetate based copolymer emulsion is preferably at least one type selected from the group consisting of ethylene-vinyl acetate copolymer emulsions, ethylene-vinyl acetate-VeoVa copolymer emulsions, and ethylene-vinyl acetate-VeoVa-(meth)acrylic monomer copolymer emulsions. Examples of the (meth)acrylic monomer constituting the ethylene-vinyl acetate-VeoVa-(meth)acrylic monomer copolymer include compounds containing a (meth)acryloyloxy group (for example, (meth)acrylic ester, (meth)acrylic acid).

Above all, from the perspective of exhibiting better injectability and excellent storage stability, the synthetic resin emulsion is preferably at least one type selected from the group consisting of ethylene-vinyl acetate based copolymer emulsions, vinyl acetate homopolymer emulsions, and polysilicone emulsions.

The method of manufacturing the synthetic resin emulsion is not particularly limited. A commercially available product can be used as the synthetic resin emulsion.

Total Mass of Content 1 of Solid Component of Natural Rubber Latex and Content 2 of Solid Component of Synthetic Resin Emulsion From the perspective of exhibiting better injectability and excellent storage stability, the total mass of the content 1 of solid component of the natural rubber latex and the content 2 of solid component of the synthetic resin emulsion is preferably from 20 to 80 mass % and more preferably from 25 to 80 mass %, of the total mass of the tire sealant.

Content 1 of Solid Component of Natural Rubber Latex

From the perspective of exhibiting better injectability and excellent puncture seal performance, the content 1 of solid component of the natural rubber latex is preferably from 15 to 90 mass %, more preferably from 20 to 90 mass %, and even more preferably from 35 to 90 mass %, of the total mass of the content 1 of solid component of the natural rubber latex and the content 2 of solid component of synthetic resin emulsion.

Water Content of Tire Sealant

From the perspective of exhibiting better injectability and excellent fluidity in the tire interior, the water content (total mass of water) in the tire sealant of an embodiment of the present invention is preferably from 20 to 50 mass % and more preferably from 30 to 50 mass %, of the total mass of the tire sealant.

Anti-Freezing Agent

The anti-freezing agent contained in the tire sealant of an embodiment of the present invention is not particularly limited provided that it is an anti-freezing agent that can typically be used in a tire sealant.

Above all, from the perspective of exhibiting better injectability and excellent low viscosity characteristics at low temperatures, the anti-freezing agent preferably contains at least one type selected from the group consisting of ethylene glycol, propylene glycol, diethylene glycol, and glycerin.

From the perspective of exhibiting better injectability, the content of the anti-freezing agent is preferably from 30 to 70 mass % and more preferably from 40 to 65 mass % of the total mass of water and the anti-freezing agent contained in the tire sealant of an embodiment of the present invention.

In an embodiment of the present invention, an example of a method for setting the relative dielectric constant of the tire sealant within a predetermined range is to set the content of anti-freezing agent within the above range relative to the total mass of water and the anti-freezing agent.

Phosphate Ions or Acetate Ions

The tire sealant of an embodiment of the present invention contains phosphate ions or acetate ions.

Phosphate Ions

In an embodiment of the present invention, "phosphate ions" signify phosphate ions in the broad sense, including phosphate ions having a valence from 1 to 3.

The above phosphate ions (phosphate ions in the broad sense) are preferably at least one type selected from the group consisting of $H_2PO_4^-$ (dihydrogenphosphate ions), $HPO_4^{2-}$ (hydrogenphosphate ions), and $PO_4^{3-}$ (phosphate ions in the narrow sense), more preferably $H_2PO_4^-$ or $HPO_4^{2-}$, and even more preferably $HPO_4^{2-}$.

Content of Phosphate Ions

In a case where the tire sealant of an embodiment of the present invention contains phosphate ions, the content of the phosphate ions is from $4.5 \times 10^{-3}$ to $11.0 \times 10^{-3}$ mass % of the total mass of the tire sealant. Within this range, the injectability of the tire sealant is excellent.

From the perspective of exhibiting better injectability and excellent storage stability, the content of the phosphate ions is preferably from $4.5 \times 10^{-3}$ to $10.5 \times 10^{-3}$ mass % and more preferably from $4.5 \times 10^{-3}$ to $9.5 \times 10^{-3}$ mass %, of the total mass of the tire sealant.

Compounds For Generating Phosphate Ions

In an embodiment of the present invention, examples of the compounds for generating phosphate ions include phosphoric acid and phosphates.

The phosphates are preferably water-soluble.

The phosphates are preferably salts of phosphoric acid with an alkali metal (for example, sodium, potassium), an alkali earth metal, or ammonium, and more preferably ammonium phosphate (ammonium phosphate in the broad sense). The above ammonium phosphate signifies ammonium phosphate in the broad sense, including ammonium salts of phosphate ions having a valence from 1 to 3.

Examples of the ammonium phosphate include monoammonium phosphate, diammonium phosphate, and $(NH_4)_3PO_4$ (ammonium phosphate in the narrow sense). Above all, monoammonium phosphate and diammonium phosphate are more preferred, and diammonium phosphate is particularly preferred.

Content of Acetate Ions

In a case where the tire sealant of an embodiment of the present invention contains acetate ions ($CH_3COO^-$), the content of the acetate ions is from 0.05 to 0.2 mass % of the total mass of the tire sealant. Within this range, the injectability of the tire sealant is excellent.

From the perspective of exhibiting better injectability and excellent storage stability, the content of the acetate ions is preferably from 0.05 to 0.18 mass % and more preferably from 0.05 to 0.18 mass %, of the total mass of the tire sealant.

Compounds For Generating Acetate Ions

In an embodiment of the present invention, examples of the compounds for generating acetate ions include acetic acid and acetates.

The acetates are preferably water-soluble.

The acetates are preferably salts of acetic acid with an alkali metal (for example, sodium or potassium) or ammonium; and more preferably ammonium acetate.

In an embodiment of the present invention, the content of the compounds for generating phosphate ions may correspond to the above content of phosphate ions. The same applies to the acetate ions.

Additionally, in an embodiment of the present invention, all the compound used for generating phosphate ions can be used to generate the above phosphate ions. The same applies to the acetate ions.

Relative Dielectric Constant

In an embodiment of the present invention, the relative dielectric constant of the tire sealant is not less than 52.9. In a case where the relative dielectric constant is within the above range, injectability is excellent.

From the perspective of exhibiting better injectability and excellent low viscosity characteristics at low temperatures, the relative dielectric constant of the tire sealant is preferably from 53 to 75 and more preferably from 55 to 70.

In an embodiment of the present invention, the dielectric constant of the tire sealant is measured at 25° C. with a voltage of 100 V and a frequency of 50 Hz using, as a measuring device, Model 871 (standard round cylindrical probe), available from Nihon Rufuto Co., Ltd.

Additionally, in an embodiment of the present invention, the relative dielectric constant of the tire sealant is a value obtained by dividing the dielectric constant measured as described above by the dielectric constant in vacuum ($\varepsilon_0 = 8.854 \times 10^{-12}$ Fm$^{-1}$).

Surfactant

A preferred aspect of the tire sealant of an embodiment of the present invention further contains a surfactant.

The surfactant is not particularly limited. Examples include non-ionic, anionic, cationic, and amphoteric surfactants.

Examples of the non-ionic surfactant include polyoxyethylene alkyl ether, polyoxyethylene alkyl phenyl ether, polyoxyethylene alkylamine, polyoxyethylene alkylamide, polyoxyethylene fatty acid ester, polyoxyethylene castor oil, polyoxyethylene fatty acid diester, polyoxyethylene rosin ester, polyoxyethylene lanolin ether, polyoxyethylene polyhydric alcohol ether, polyoxyethylene polyhydric alcohol fatty acid ester, polyhydric alcohol fatty acid ester, fatty acid alkanolamide, and the like. The HLB value of the non-ionic surfactant is preferably from 12.0 to 19.0.

The HLB value signifies the value calculated using the Oda formula based on an organic conceptual diagram. The method for calculating it is described in, for example, "Techniques of Emulsification and Solubilization" (1976, Kogaku Tosho Co., Ltd.). Additionally, the organic values and inorganic values for deriving HLB can be calculated using the inorganic base table (values reported by Fujita et al., 1974) according to "Organic Conceptual Diagram—Fundamentals and Applications—" (1984, Sankyo Shuppan Co., Ltd.).

Examples of the polyoxyethylene alkyl ether include polyoxyethylene decyl ether, polyoxyethylene lauryl ether, polyoxyethylene cetyl ether, polyoxyethylene stearyl ether, polyoxyethylene oleyl ether, polyoxyethylene 2-ethylhexyl ether, polyoxyethylene isodecyl ether, polyoxyethylene tridecyl ether, and polyoxyethylene isostearyl ether.

Examples of the anionic surfactant include alkyl sulfates (for example, sodium lauryl sulfate), alkyl ether sulfates, polyoxyethylene alkyl ether sulfates, polyoxyethylene alkyl phenyl ether sulfates, alkylbenzene sulfonates, alkylnaphthalene sulfonates, salts of higher fatty acids (soaps), α-sulfo fatty acid methyl ester salts, α-olefin sulfonates, alkane sulfonates, polyoxy-mono- and di-styryl phenylether monoester sulfosuccinates, and alkyl phenoxy polyoxyethylene propyl sulfonates.

Examples of the cationic surfactant include tetraalkyl ammonium chloride, trialkyl benzyl ammonium chloride, alkylamines, monooxyethylene alkylamines, and polyoxyethylene alkylamines.

From the perspective of exhibiting better injectability into a tire at high temperatures and exhibiting excellent sealing properties and storage performance, the surfactant preferably includes a non-ionic surfactant and an anionic surfactant.

In a case where a non-ionic surfactant and an anionic surfactant are used in combination, the mass ratio of the non-ionic surfactant and the anionic surfactant (non-ionic surfactant/anionic surfactant) is preferably from 1.0/1.0 to 1.0/10.0. Within this range, injectability into a tire is better and sealing properties and storage performance are excellent.

From the perspective of exhibiting better injectability into a tire and exhibiting excellent sealing properties and storage performance, the content of surfactants (in a case where surfactants are used in combination, the total mass thereof) is preferably from 1.0 to 6.0 parts by mass per 100 parts by mass of solid component of natural rubber latex.

Other Components

In addition to the components described above, the tire sealant of the present invention can optionally contain additives such as gelling agents, fillers, anti-aging agents, antioxidants, pigments, plasticizers, thixotropic agents, UV absorbents, flame retardants, dispersants, dehydrating agents, and antistatic agents.

Manufacturing Method

The method of manufacturing the tire sealant of an embodiment of the present invention is not particularly limited. An example of the manufacturing method includes sufficiently mixing the natural rubber latex, synthetic resin emulsion, anti-freezing agent, compounds for generating phosphate ions or acetate ions, and, as desired, surfactants and additives using a mixer such as a combination mixer under reduced pressure.

Water can be further added to the system as necessary.

The usage temperature of the tire sealant of an embodiment of the present invention is not particularly limited and can be a wide range of temperatures. For example, the usage temperature can be from −40 to +80° C.

From the perspective of exhibiting better injectability and excellent puncture repair performance, the viscosity at −40° C. of the tire sealant of an embodiment of the present invention is preferably from 2000 to 4000 mPa·s and more preferably from 2500 to 3200 mPa·s.

Tire Repair Kit

The tire repair kit of an embodiment of the present invention includes the tire sealant of an embodiment of the present invention and a compressor.

The tire sealant used in the tire repair kit of an embodiment of the present invention is not particularly limited provided that it is the tire sealant of an embodiment of the present invention.

The compressor used in the tire repair kit of an embodiment of the present invention is not particularly limited. Examples include an air compressor. An example of a preferable aspect is a low-capacity compressor that uses the power supply of a cigarette lighter socket provided in a vehicle.

EXAMPLES

The present invention is described below in detail using examples, but the present invention is not limited to such examples.

Manufacture of Tire Sealant

The components listed in Table 1 below were mixed in the compositions (part by mass) listed in the same table using an agitator to produce tire sealants.

In Table 1, the numeric values in the "Phosphate ions 1 from diammonium phosphate" column indicate the content (mass %) of phosphate ions 1 in the total mass of the tire sealant. The same applies to the "Phosphate ions 2 from monoammonium phosphate".

Evaluation

The following evaluations were performed on the tire sealants produced as described above. The results are listed in Table 1.

Injectability at +70° C.

350 mL of the tire sealant produced as described above was heated to 70° C.

The above tire sealant was injected into a 195/65 R15 tire (including a puncture hole (diameter of 4 mm) in the shoulder groove portion of the tread) via the valve core using a compressor at an injection pressure of 300 kPa, and the time from the start of injection to the completion of injection was measured.

Evaluation Criteria

In a case where the injection time is within 40 seconds, injectability is excellent.

In a case where the injection time is within 30 seconds, injectability is superior.

Puncture Repair Distance: Evaluation of Sealing Properties

A puncture hole (diameter of 4 mm) was made in the shoulder groove portion of the tread of a 215/60 R16 tire.

Next, the punctured tire was mounted on a drum testing machine, 350 mL of the tire sealant produced as described above was injected via the valve core of the tire, and the tire was filled with air until the tire internal pressure reached 200 kPa.

The tire was then subjected to repeated intermittent driving, in which the above tire was driven at a speed of 30 km/h under a load of 350 kg and then stopped. The travel distance for which the tire puncture was repaired (puncture repair distance) until air leakage stopped was measured. The presence or absence of air leakage was confirmed by spraying soapy water on the portion including the above puncture hole and checking whether the soapy water forms bubbles.

Evaluation Criteria

Sealing properties are improved in a case where the puncture repair distance is within 6 km.

Low-temperature Injectability: Viscosity of Tire Sealant at −40° C.

The viscosity of the tire sealant produced as described above was measured at −40° C. at a rotational speed of 20 rpm using a Brookfield viscometer (trade name, B-type viscometer; rotor No. 3, available from Toyo Seiki Kogyo Co., Ltd.).

Evaluation Criteria

In a case where the viscosity of the tire sealant at −40° C. is not greater than 3500 mPa·s, the tire sealant has excellent injectability at low temperatures.

TABLE 1

Table 1-1

| | Comparative Example | | Example | | | Comparative Example | | Example | | |
|---|---|---|---|---|---|---|---|---|---|---|
| | 1 | 2 | 1 | 2 | 3 | 3 | 4 | 4 | 5 | 6 |
| Water | 16.5 | 16.5 | 16.5 | 16.5 | 16.5 | 16.5 | 16.5 | 16.5 | 16.5 | 16.5 |
| NR latex 1 | 33.7 | 33.7 | 33.7 | 33.7 | 33.7 | 33.7 | 33.7 | 33.7 | 33.7 | 33.7 |
| (Content of solid component of NR latex 1) | (20.2) | (20.2) | (20.2) | (20.2) | (20.2) | (20.2) | (20.2) | (20.2) | (20.2) | (20.2) |
| Surfactant 1 | 0.41 | 0.41 | 0.41 | 0.41 | 0.41 | 0.41 | 0.41 | 0.41 | 0.41 | 0.41 |
| Surfactant 2 | 0.41 | 0.41 | 0.41 | 0.41 | 0.41 | 0.41 | 0.41 | 0.41 | 0.41 | 0.41 |
| Diammonium phosphate (132.1) | | 0.3 | 0.6 | 0.8 | 1.0 | 1.5 | | | | |
| Phosphate ions 1 from diammonium phosphate | | 0.0023 | 0.0045 | 0.0061 | 0.0076 | 0.0114 | | | | |
| Monoammonium phosphate (115.3) | | | | | | | 0.3 | 0.6 | 0.8 | 1.2 |
| Phosphate ions 2 from monoammonium phosphate | | | | | | | 0.0026 | 0.0052 | 0.0069 | 0.0104 |
| Synthetic resin emulsion 1 | 9.575 | 9.575 | 9.575 | 9.575 | 9.575 | 9.575 | 9.575 | 9.575 | 9.575 | 9.575 |
| (Content of solid component of synthetic resin emulsion 1) | (5.3) | (5.3) | (5.3) | (5.3) | (5.3) | (5.3) | (5.3) | (5.3) | (5.3) | (5.3) |
| Anti-freezing agent 1 | 39.45 | 39.45 | 39.45 | 39.45 | 39.45 | 39.45 | 39.45 | 39.45 | 39.45 | 39.45 |
| Relative dielectric constant of tire sealant | 65 | 66 | 66 | 67 | 67 | 67 | 66 | 67 | 67 | 67 |
| Total | 100.045 | 100.3473 | 100.6495 | 100.8511 | 101.0526 | 101.5564 | 100.3476 | 100.6502 | 100.8519 | 101.2554 |
| Total mass of water | 34.28 | 34.28 | 34.28 | 34.28 | 34.28 | 34.28 | 34.28 | 34.28 | 34.28 | 34.28 |
| Anti-freezing agent 1/ (total mass of water + anti-freezing agent 1) (mass %) | 53.5 | 53.5 | 53.5 | 53.5 | 53.5 | 53.5 | 53.5 | 53.5 | 53.5 | 53.5 |
| Injectability at +70° C. (seconds) | 45 | 42 | 17 | 16 | 16 | 21 | 45 | 25 | 21 | 20 |
| Puncture repair distance (km) | — | 4.5 | 3.5 | 4.5 | 4.5 | 6.0 | 3.5 | 4.5 | 6.0 | 4.5 |
| Injectability at low temperatures (viscosity at −40° C. (mPa·s)) | 2700 | 2750 | 2890 | 3010 | 3250 | 3670 | 2660 | 2690 | 3000 | 3140 |

TABLE 2

Table 1-2

|  | Example | | Comparative Example | Example | | Comparative Example |
| --- | --- | --- | --- | --- | --- | --- |
|  | 7 | 8 | 5 | 9 | 10 | 6 |
| Water | 16.5 | 16.5 | 16.5 | 16.5 | 16.5 | 16.5 |
| NR latex 1 | 33.7 | 33.7 | 33.7 | 33.7 | 33.7 | 33.7 |
| (Content of solid component of NR latex 1) | (20.2) | (20.2) | (20.2) | (20.2) | (20.2) | (20.2) |
| Surfactant 1 | 0.41 | 0.41 | 0.41 | 0.41 | 0.41 | 0.41 |
| Surfactant 2 | 0.41 | 0.41 | 0.41 | 0.41 | 0.41 | 0.41 |
| Diammonium phosphate (132.1) | 0.6 | 1.0 | 1.5 |  |  | 0.6 |
| Phosphate ions 1 from diammonium phosphate | 0.0045 | 0.0076 | 0.0114 |  |  | 0.0045 |
| Monoammonium phosphate (115.3) |  |  |  | 0.6 | 1.2 |  |
| Phosphate ions 2 from monoammonium phosphate |  |  |  | 0.0052 | 0.0104 |  |
| Synthetic resin emulsion 1 | 9.575 | 9.575 | 9.575 | 9.575 | 9.575 | 9.575 |
| (Content of solid component of synthetic resin emulsion 1) | (5.3) | (5.3) | (5.3) | (5.3) | (5.3) | (5.3) |
| Anti-freezing agent 1 | 34.24 | 34.24 | 34.24 | 34.24 | 34.24 | 44.5 |
| Relative dielectric constant of tire sealant | 56 | 56 | 57 | 57 | 57 | 52.4 |
| Total | 95.4395 | 95.8426 | 96.3464 | 95.4402 | 96.0454 | 105.6995 |
| Total mass of water | 34.28 | 34.28 | 34.28 | 34.28 | 34.28 | 34.28 |
| Anti-freezing agent 1/ (total mass of water + anti-freezing agent 1) (mass %) | 50.0 | 50.0 | 50.0 | 50.0 | 50.0 | 56.4 |
| Injectability at +70° C. (seconds) | 17 | 16 | 30 | 19 | 17 | 66 |
| Puncture repair distance (km) | 4.5 | 4.5 | 4.5 | 3.5 | 4.5 | — |
| Injectability at low temperatures (viscosity at −40° C. (mPa · s)) | 2780 | 3260 | 3510 | 2800 | 3180 | 2990 |

| Table 1-2 | Example | | Example | | |
| --- | --- | --- | --- | --- | --- |
|  | 11 | 12 | 13 | 14 | 15 |
| Water | 16.5 | 16.5 | 16.5 | 16.5 | 16.5 |
| NR latex 1 | 33.7 | 33.7 | 33.7 | 33.7 | 33.7 |
| (Content of solid component of NR latex 1) | (20.2) | (20.2) | (20.2) | (20.2) | (20.2) |
| Surfactant 1 | 0.41 | 0.41 | 0.41 | 0.41 | 0.41 |
| Surfactant 2 | 0.41 | 0.41 | 0.41 | 0.41 | 0.41 |
| Diammonium phosphate (132.1) | 1.0 |  | 0.6 | 0.8 |  |
| Phosphate ions 1 from diammonium phosphate | 0.0076 |  | 0.00456 | 0.0061 |  |
| Monoammonium phosphate (115.3) |  | 1.2 |  |  | 1.1 |
| Phosphate ions 2 from monoammonium phosphate |  | 0.0104 |  |  | 0.0102 |
| Synthetic resin emulsion 1 | 9.575 | 9.575 | 9.575 | 9.575 | 9.575 |
| (Content of solid component of synthetic resin emulsion 1) | (5.3) | (5.3) | (5.3) | (5.3) | (5.3) |
| Anti-freezing agent 1 | 44.5 | 44.5 | 27.5 | 27.5 | 27.5 |
| Relative dielectric constant of tire sealant | 52.9 | 53.2 | 63.0 | 64.1 | 63.9 |
| Total | 106.1026 | 106.3054 | 88.6996 | 88.9011 | 89.2052 |
| Total mass of water | 34.28 | 34.28 | 34.28 | 34.28 | 34.28 |
| Anti-freezing agent 1/ (total mass of water + anti-freezing agent 1) (mass %) | 56.4 | 56.4 | 44.5 | 44.5 | 44.5 |
| Injectability at +70° C. (seconds) | 36 | 37 | 33 | 15 | 16 |
| Puncture repair distance (km) | 10.5 | 12.0 | 4.5 | 4.5 | 6.0 |
| Injectability at low temperatures (viscosity at −40° C. (mPa · s)) | 3100 | 3250 | 2370 | 2400 | 2540 |

Details of the components listed in Table 1 are as follows.
Water: Distilled water
NR latex 1: Natural rubber latex (Hytex HA, available from Fulflex, Inc., Nomura Trading Co., Ltd.; content of solid component: 60 mass %)
Surfactant 1: Anionic surfactant, sodium lauryl sulfate (product name: Emal 10PT, available from Kao Corporation)
Surfactant 2: Non-ionic surfactant, polyoxyethylene oleyl ether (Emulgen 430 (E430), available from Kao Corporation)
Diammonium phosphate: $(NH_4)_2HPO_4$ (available from Wako Pure Chemical Industries, Ltd.; molecular weight: 132.1)
Monoammonium phosphate: $NH_4HPO_4$ (available from Wako Pure Chemical Industries, Ltd.; molecular weight: 115.3)
Synthetic resin emulsion 1: Ethylene-vinyl acetate copolymer resin emulsion (Sumikaflex 400HQ, available from Sumika Chemtex Co., Ltd.; content of solid component: approximately 55 mass %; Tg of ethylene-vinyl acetate copolymer: 0° C.)
Anti-freezing agent 1: Propylene glycol (propylene glycol for industrial use, available from ADEKA Corporation)

As can be seen from the results listed in Table 1, the injectability at high temperatures (70° C.) or the injectability at low temperatures (viscosity at −40° C.) was poor in Comparative Example 1, which does not contain phosphate ions or acetate ions, and in Comparative Examples 2 to 5, in which the contents of phosphate ions fall beyond the predetermined range.

Additionally, the injectability at high temperatures (70° C.) was poor in Comparative Example 6, in which the relative dielectric constant falls beyond the predetermined range.

In contrast, the tire sealant according to an embodiment of the present invention had excellent injectability.

The tire sealant according to an embodiment of the present invention can have excellent injectability over a wide range of temperatures.

Additionally, when the injectability at high temperatures is compared between Examples 1 to 3 (containing $HPO_4^{2-}$) and Examples 4 to 6 (containing $H_2PO_4^-$), Examples 1 to 3 had a shorter injection time and better injectability than Examples 4 to 6.

When Examples 1 to 3 are compared, those with a larger amount of phosphate ions had better injectability. Similar results were obtained in a comparison of Examples 4 to 6, a comparison of Examples 7 and 8, a comparison of Examples 9 and 10, and a comparison of Examples 13 and 14.

When Examples 3, 8, and 11 are compared, Examples 3 and 8, in which the relative dielectric constant is greater than in Example 11, had better injectability at high temperatures and better sealing properties than Example 11. Similar results were also obtained in a comparison of Examples 10 and 12.

The invention claimed is:

1. A tire sealant comprising:
a natural rubber latex;
a synthetic resin emulsion;
an anti-freezing agent; and
phosphate ions or acetate ions; wherein
a content of the phosphate ions is from $4.5 \times 10^{-3}$ to $11.0 \times 10^{-3}$ mass % in a case where the tire sealant contains phosphate ions;
a content of the acetate ions is from 0.05 to 0.2 mass % in a case where the tire sealant contains acetate ions; and
a relative dielectric constant is not less than 52.9.

2. The tire sealant according to claim 1, wherein the synthetic resin emulsion is at least one type selected from the group consisting of ethylene-vinyl acetate based copolymer emulsions, vinyl acetate homopolymer emulsions, and polysilicone emulsions.

3. The tire sealant according to claim 1, wherein the anti-freezing agent is at least one type selected from the group consisting of ethylene glycol, propylene glycol, diethylene glycol, and glycerin.

4. The tire sealant according to claim 1, wherein a content 1 of a solid component of the natural rubber latex is from 15 to 90 mass % of a total mass of the content 1 and a content 2 of a solid component of the synthetic resin emulsion.

5. The tire sealant according to claim 1, wherein a content of anti-freezing agent is from 30 to 70 mass % of a total mass of water and the anti-freezing agent contained in the tire sealant.

6. The tire sealant according to claim 1, wherein the phosphate ions are at least one type selected from the group consisting of $H_2PO_4^-$, $HPO_4^{2-}$, and $PO_4^{3-}$.

7. The tire sealant according to claim 1, further comprising a surfactant.

8. A tire repair kit comprising the tire sealant described in claim 1 and a compressor.

9. The tire sealant according to claim 2, wherein the anti-freezing agent is at least one type selected from the group consisting of ethylene glycol, propylene glycol, diethylene glycol, and glycerin.

10. The tire sealant according to claim 2, wherein a content 1 of a solid component of the natural rubber latex is from 15 to 90 mass % of a total mass of the content 1 and a content 2 of a solid component of the synthetic resin emulsion.

11. The tire sealant according to claim 2, wherein a content of anti-freezing agent is from 30 to 70 mass % of a total mass of water and the anti-freezing agent contained in the tire sealant.

12. The tire sealant according to claim 2, wherein the phosphate ions are at least one type selected from the group consisting of $H_2PO_{4-}$, $HPO_4^{2-}$, and $PO_4^{3-}$.

13. The tire sealant according to claim 2, further comprising a surfactant.

14. The tire sealant according to claim 3, wherein a content 1 of a solid component of the natural rubber latex is from 15 to 90 mass % of a total mass of the content 1 and a content 2 of a solid component of the synthetic resin emulsion.

15. The tire sealant according to claim 3, wherein a content of anti-freezing agent is from 30 to 70 mass % of a total mass of water and the anti-freezing agent contained in the tire sealant.

16. The tire sealant according to claim 3, wherein the phosphate ions are at least one type selected from the group consisting of $H_2PO_4^-$, $HPO_4^{2-}$, and $PO_4^{3-}$.

17. The tire sealant according to claim 3, further comprising a surfactant.

18. The tire sealant according to claim 4, wherein a content of anti-freezing agent is from 30 to 70 mass % of a total mass of water and the anti-freezing agent contained in the tire sealant.

19. The tire sealant according to claim 4, wherein the phosphate ions are at least one type selected from the group consisting of $H_2PO_4^-$, $HPO_4^{2-}$, and $PO_4^{3-}$.

20. The tire sealant according to claim 4, further comprising a surfactant.

* * * * *